(12) United States Patent
Iwai et al.

(10) Patent No.: US 8,654,300 B2
(45) Date of Patent: Feb. 18, 2014

(54) DISPLAY APPARATUS

(75) Inventors: Keita Iwai, Kawasaki (JP); Hisakazu Hazama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 304 days.

(21) Appl. No.: 13/018,135

(22) Filed: Jan. 31, 2011

(65) Prior Publication Data

US 2011/0187980 A1    Aug. 4, 2011

(30) Foreign Application Priority Data

Feb. 2, 2010   (JP) ................................. 2010-021268

(51) Int. Cl.
*G02F 1/1345*   (2006.01)

(52) U.S. Cl.
USPC .......................................... 349/149; 349/150

(58) Field of Classification Search
USPC .................................. 349/150, 149
See application file for complete search history.

(56) References Cited

U.S. PATENT DOCUMENTS

| | | | |
|---|---|---|---|
| 7,880,827 B2 * | 2/2011 | Cheng | 349/58 |
| 7,980,714 B2 * | 7/2011 | Itaya | 362/97.1 |
| 2002/0054252 A1 * | 5/2002 | Ishii et al. | 349/106 |
| 2006/0066770 A1 * | 3/2006 | Hayano et al. | 349/58 |
| 2008/0002093 A1 * | 1/2008 | Kim | 349/58 |
| 2008/0030670 A1 * | 2/2008 | Ishii et al. | 349/153 |
| 2008/0170172 A1 * | 7/2008 | Okuda | 349/59 |
| 2009/0021679 A1 * | 1/2009 | Cheng | 349/122 |
| 2009/0103282 A1 * | 4/2009 | Itaya | 362/97.1 |

FOREIGN PATENT DOCUMENTS

| | | |
|---|---|---|
| CN | 1892363 A | 1/2007 |
| CN | 101398555 A | 4/2009 |
| JP | 03-259119 A | 11/1991 |
| JP | 7-209635 A | 8/1995 |
| JP | 11-064827 A | 3/1999 |
| JP | 2009-198849 A | 9/2009 |
| JP | 2009-198849 A2 | 9/2009 |
| JP | 2010-015094 A | 1/2010 |

* cited by examiner

*Primary Examiner* — Kaveh Kianni
(74) *Attorney, Agent, or Firm* — Canon USA, Inc. IP Division

(57) ABSTRACT

A display apparatus includes a liquid crystal display panel, a flexible circuit board connected to a connection portion formed on one side of the liquid crystal display panel, a display window bonded to a display surface of the liquid crystal display panel so that an end face thereof protrudes from an end face on one side of the liquid crystal display panel, an exterior member in which an opening where the display window is arranged is formed, and a first light shielding member arranged so that the flexible circuit board positioned near a gap is covered therewith if the display window is arranged in the opening so that the gap is formed between the end face of the display window and the end face of the opening.

10 Claims, 8 Drawing Sheets

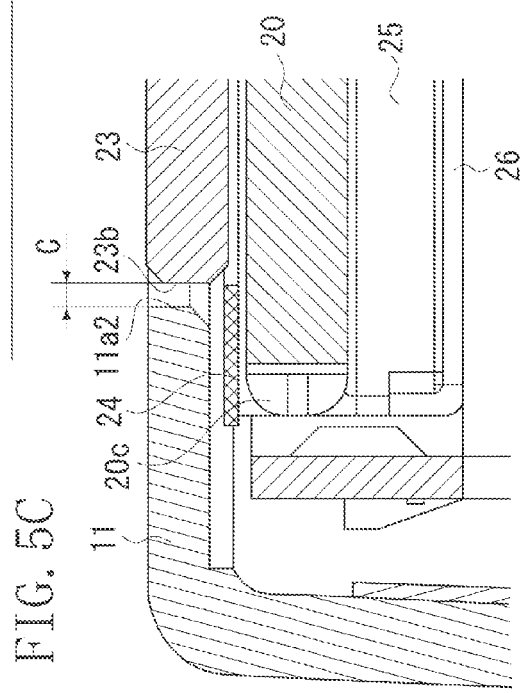
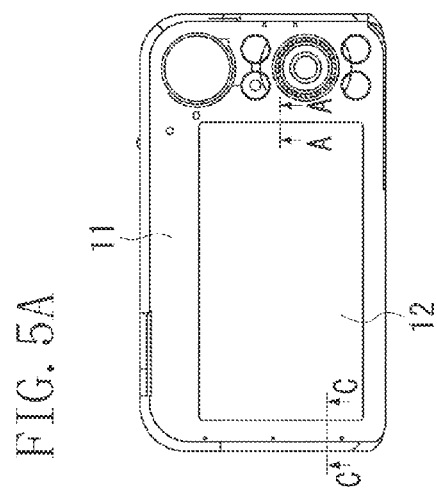

DISPLAY APPARATUS

BACKGROUND OF THE INVENTION

1. Field of the Invention

The present invention relates to a display apparatus of a digital camera and the like.

2. Description of the Related Art

A digital camera has a liquid crystal display panel to check a photographed image. A glass substrate is generally used for the liquid crystal display panel and is prone to be damaged by an external force or unevenness of display due to orientation variation caused by deformation. Thus, the liquid crystal display panel is protected so as not to be directly exposed to an external appearance by bonding a display window formed of an acryl plate or the like as to an exterior member.

However, providing a display window may create an air layer between the display window and the liquid crystal display panel, so that an interface with air will be increased. In other words, a reflecting surface will be increased which may damage visibility of the liquid crystal display panel.

To improve visibility by eliminating an optical loss at the interface, a technique to fill a space between the display window and the liquid crystal display panel with a gel state transparent resin or a low-rebound resilient transparent resin or to bond the transparent resin with the display window and the liquid crystal display panel is known. Such technique is generally called optical coupling. This technique is directed to improve visibility of the liquid crystal display panel by matching refractive indices of the display window, an optical member on the liquid crystal display panel side, and the transparent resin to eliminate the reflecting surface, and by reducing reflection of external light and the optical loss (see Japanese Patent Application Laid-Open No. 07-209635).

To adopt such a configuration, bonding a display window one size larger than the liquid crystal display panel to the display surface of the liquid crystal display panel and fitting the display window into an opening formed in the exterior member and then bonding a periphery of the display window to the exterior member can be considered. However, digital cameras in recent years have a liquid crystal display panel with an ever larger display surface while a body size is reduced, so that it is difficult to secure a bonding space for the exterior member in the periphery of the display window.

Thus, a configuration in which the display window bonded to the liquid crystal display panel is only fitted into an opening formed in the exterior member, and the display window and the exterior member are not bonded is discussed. However, this configuration may create a slight gap between an end face of the display window and that of the exterior member. It is not desirable that an internal structure of the digital camera is seen through the gap from the viewpoint of quality. Moreover, issues such as malfunctioning and damaged control IC may be caused by penetration of static electricity through the gap.

Further, if the above configuration is adopted, a member called an upper bezel for covering the periphery of the liquid crystal display panel cannot be provided on the display surface side of the liquid crystal display panel. Therefore, an issue is caused that light from a backlight is more likely to be leaked in the direction of the display surface of the liquid crystal display panel.

SUMMARY OF THE INVENTION

According to an aspect of the present invention, a display apparatus includes a liquid crystal display panel, a flexible circuit board connected to a connection portion formed on one side of the liquid crystal display panel, a display window bonded to a display surface of the liquid crystal display panel, an exterior member in which an opening where the display window is arranged is formed, and a first light shielding member arranged so that the connection portion and the flexible circuit board are covered therewith, wherein, if the display window is arranged in the opening so that a gap is formed between an end face of the display window and an end face of the opening, the first light shielding member covers the connection portion and the flexible circuit board which are located near the gap.

According to the present invention, the display apparatus capable of taking measures against static electricity can be provided in which an internal structure cannot be seen even if a gap is created between the end face of the display window and that of the exterior member. Moreover, the display apparatus in which light from a backlight is not leaked in the direction of the display surface of the liquid crystal display panel can be provided.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 5A to 5C illustrate a state in which a liquid crystal display unit and a rear cover are fixed to a camera assembly.

DESCRIPTION OF THE EMBODIMENTS

Various exemplary embodiments, features, and aspects of the invention will be described in detail below with reference to the drawings.

A first exemplary embodiment according to the present invention will be described below with reference to FIGS. 1A to 5C.

Figure 1A:
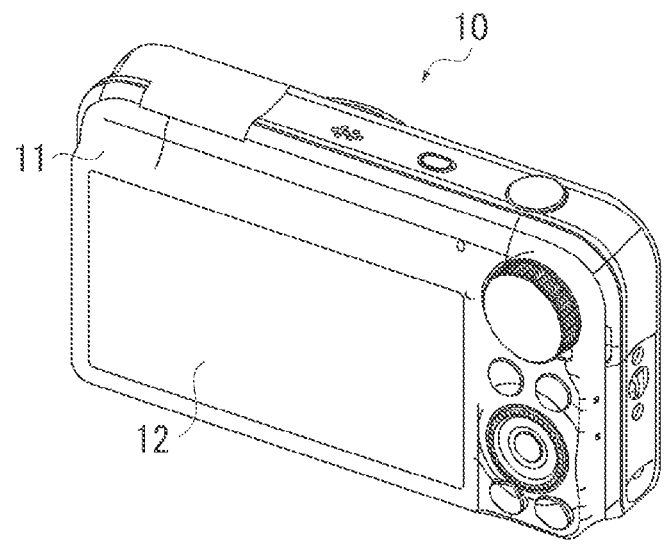
FIGS. 1A and 1B illustrate a digital camera as a first exemplary embodiment of a display apparatus according to the present invention.
Figure 1B:
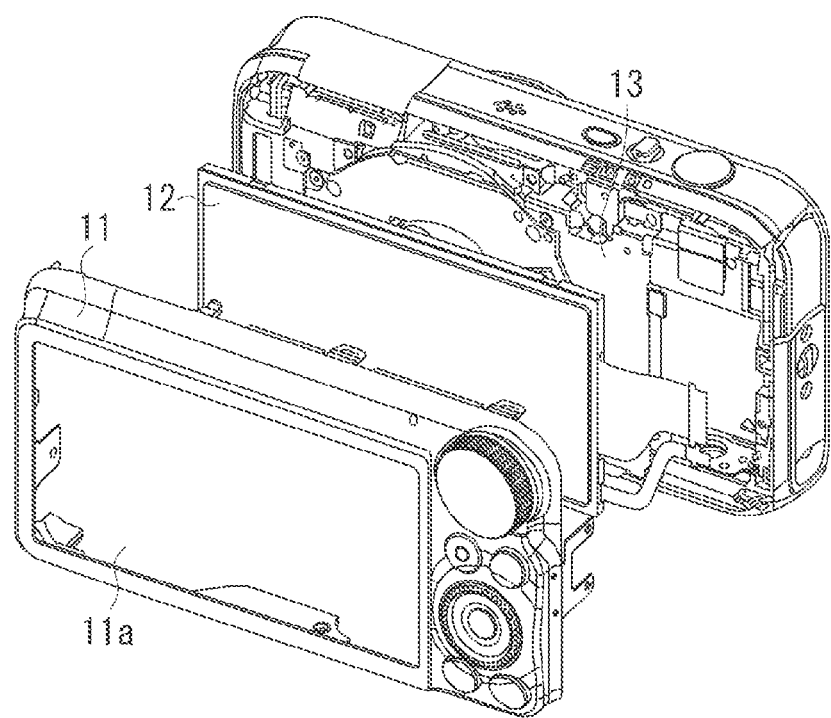

FIGS. 1A and 1B illustrate a digital camera 10 as the first exemplary embodiment of a display apparatus according to the present invention. As illustrated in FIG. 1A, a liquid crystal display unit 12 to display an image and a rear cover 11 as an exterior member are mounted on a rear side of the digital camera 10. FIG. 1B is an exploded perspective view of the digital camera 10. After the liquid crystal display unit 12 is fixed to a camera assembly 13, the rear cover 11 is fixed to the camera assembly 13. The rear cover 11 has an opening 11a formed therein and is fixed to the camera assembly 13 in such a way that the surface of the liquid crystal display unit 12 is exposed through the opening 11a.

Figure 2:
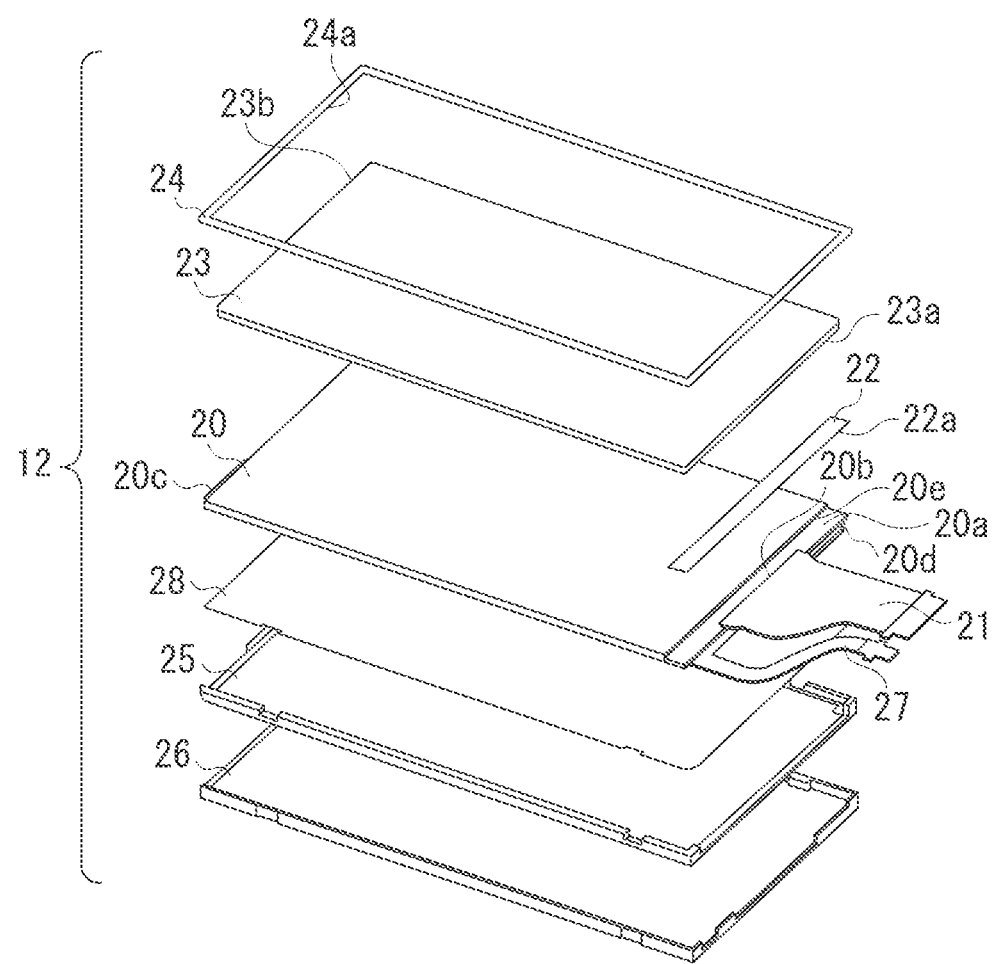
FIG. 2 is an exploded perspective view illustrating a configuration of a liquid crystal display unit.

FIG. 2 is an exploded perspective view illustrating a configuration of the liquid crystal display unit 12.

As illustrated in FIG. 2, a lower bezel 26 has a spacer 25 mounted thereon. The spacer 25 holds a liquid crystal display panel 20 and a backlight light source (not illustrated) and also fixes a light guiding member 28 that guides light from the backlight light source. The liquid crystal display panel 20 and the light guiding member 28 are positioned by the spacer 25 in mutual surface direction and thickness direction. A backlight flexible circuit board 27 supplies power to the backlight light source.

The liquid crystal display panel 20 is formed by laminating two glass substrates having different sizes in a longitudinal direction. The glass substrate longer in the longitudinal direction is placed below and a circuit connection portion 20b as a connection portion is formed in an area 20a on the lower glass substrate that is not covered by the upper glass substrate. A flexible circuit board 21 is electrically connected to the circuit connection portion 20b.

More specifically, one short side of the liquid crystal display panel 20 is not covered with the upper glass substrate to form the area 20a where an upper surface of the lower glass substrate is exposed and the flexible circuit board 21 is provided therein. A sealing portion 20c is formed on a side opposite to the side where the area 20a is formed in the liquid crystal display panel 20. The sealing portion 20c seals a liquid crystal filled between the upper glass substrate and the lower glass substrate.

A first light shielding tape 22 which is a first light shielding member is formed of an insulating material and stuck on the area 20a in such a way that the circuit connection portion 20b and the flexible circuit board 21 are covered therewith. After the first light shielding tape 22 is stuck, a display window 23 is bonded to the display surface of the liquid crystal display panel 20 via a gel state transparent resin or a low-rebound resilient transparent resin.

Then, a second light shielding tape 24 which is a second light shielding member is stuck in such a way that an area where the display window 23 is not bonded on the display surface of the liquid crystal display panel 20 positioned in a periphery of the display window 23 and a surface of the spacer 25 are covered therewith. The liquid crystal display unit 12 is configured in this manner.

FIGS. 3A to 3D and FIGS. 4A to 4D illustrate how the first light shielding tape 22, the display window 23, and the second light shielding tape 24 are stuck on the liquid crystal display panel 20 held by the spacer 25 mounted on the lower bezel 26.

Figure 3A:
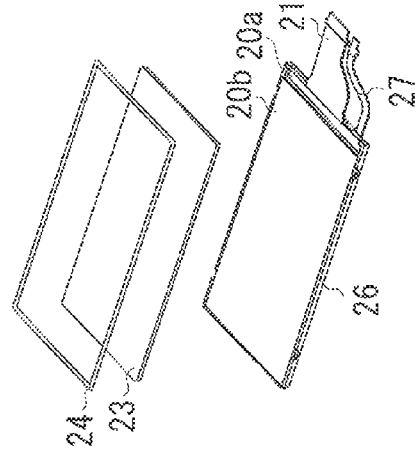
FIGS. 3A to 3D are perspective views illustrating how a first light shielding tape, a display window, and a second light shielding tape are stuck on a liquid crystal display panel.
Figure 4A:
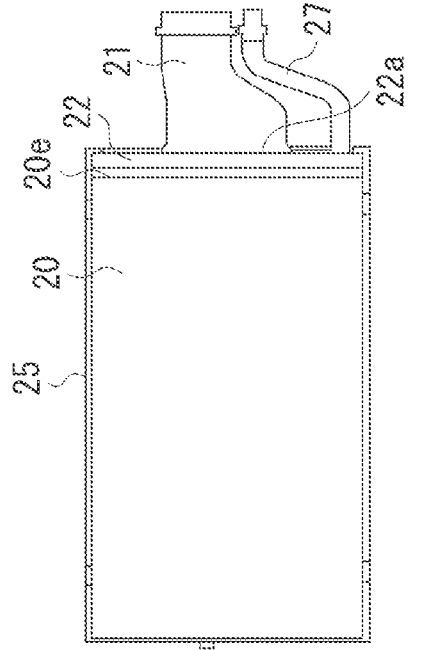
FIGS. 4A to 4D are front views illustrating how the first light shielding tape, the display window, and the second light shielding tape are stuck on the liquid crystal display panel.

FIG. 3A is a perspective view illustrating how the liquid crystal display panel 20 is held by the spacer 25 mounted on the lower bezel 26. In this state, the first light shielding tape 22, the display window 23, and the second light shielding tape 24 are not yet stuck. FIG. 4A illustrates a state in FIG. 3A when viewed from the front. In FIG. 4A, the first light shielding tape 22, the display window 23, and the second light shielding tape 24 are omitted.

Figure 3B:
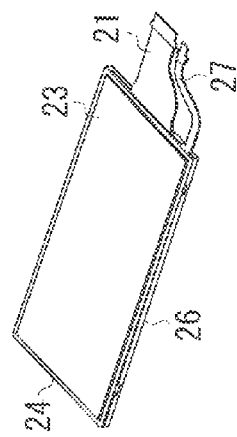
Figure 4B:
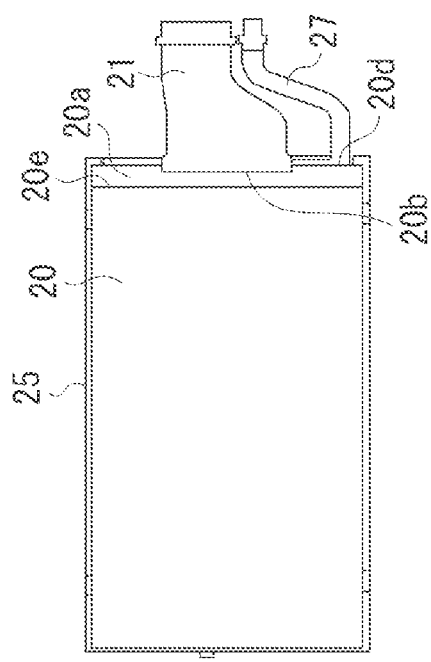

FIG. 3B illustrates a state after the first light shielding tape 22 is stuck on the area 20a in the state in FIG. 3A. By sticking the first light shielding tape 22 on the area 20a, the first light shielding tape 22 covers the circuit connection portion 20b and the flexible circuit board 21 in the area 20a. FIG. 4B illustrates a state in FIG. 3B when viewed from the front. In FIG. 4B, the display window 23 and the second light shielding tape 24 are omitted.

The first light shielding tape 22 is stuck on the area 20a of the liquid crystal display panel 20 in such a way that an edge 22a of the first light shielding tape 22 protrudes to a right side in the drawing from an edge 20d of the liquid crystal display panel 20. Thus, the edge 20d of the liquid crystal display panel 20 is covered with the first light shielding tape 22. The area 20a is located immediately above the backlight light source and thus, light leaked from the backlight light source can efficiently be blocked by sticking the first light shielding tape 22 thereon.

Figure 3C:
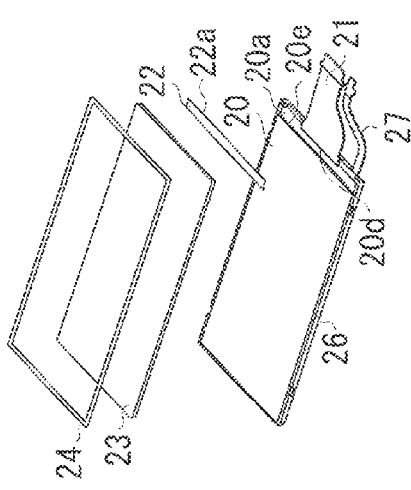

FIG. 3C illustrates a state after the display window 23 is bonded to the display surface of the liquid crystal display panel 20 via the gel state transparent resin or the low-rebound resilient transparent resin in the state in FIG. 3B. The display window 23 is longer than the liquid crystal display panel 20 in a long-side direction and shorter than the liquid crystal display panel 20 in a short-side direction.

Figure 4C:
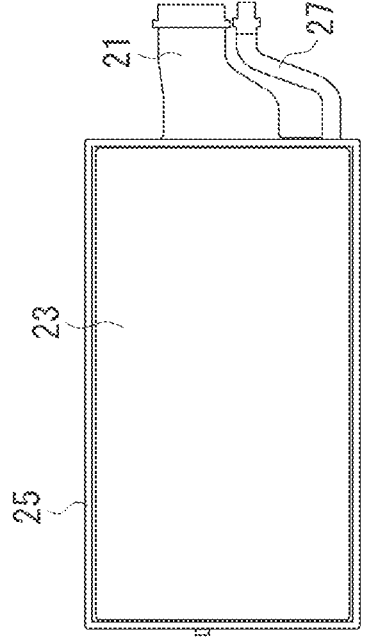

FIG. 4C illustrates the state in FIG. 3C when viewed from the front. In FIG. 4C, the second light shielding tape 24 is omitted. As illustrated in FIG. 4C, the display window 23 is bonded to the display surface of the liquid crystal display panel 20 in such a way that an end face 23a of the display window 23 protrudes from an end face 20e of the upper glass substrate of the liquid crystal display panel 20 on one side in which the area 20a of the liquid crystal display panel 20 is formed. Accordingly, the first light shielding tape 22 is covered with one side of the display window 23 from above. The spacer 25 is positioned on an outer side from the end face 23a of the display window 23 on one side where the area 20a of the liquid crystal display panel 20 is formed.

As illustrated in FIG. 4C, on three sides other than the side where the area 20a of the liquid crystal display panel 20 is formed, the display window 23 is bonded to the display surface of the liquid crystal display panel 20 in such a way that end faces of the liquid crystal display panel 20 protrude from those of the display window 23. Thus, in the state illustrated in FIG. 4C, the spacer 25 protrudes from the end face 23a of the display window 23 on one side where the area 20a is formed of the periphery of the display window 23. On three sides other than the side where the area 20a is formed, the liquid crystal display panel 20 and the spacer 25 protrude from end faces of the display window 23.

Figure 3D:
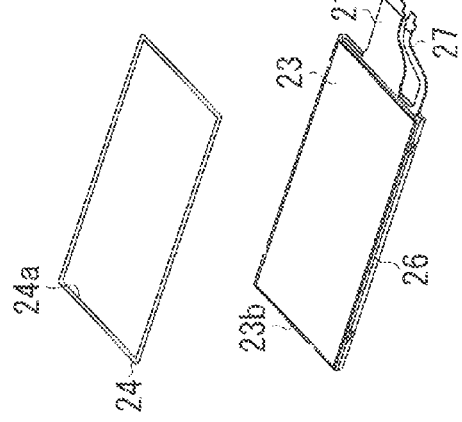

FIG. 3D illustrates a state after the second light shielding tape 24 is stuck on the periphery of the display window 23 in the state in FIG. 3C. On one side where the area 20a is formed, the second light shielding tape 24 is stuck on the spacer 25. On three sides other than the side where the area 20a is formed, the second light shielding tape 24 is stuck on the liquid crystal display panel 20 and the spacer 25.

As illustrated in FIG. 2 and FIGS. 3A to 3D, the second light shielding tape 24 has a hollow quadrangular shape and is stuck to cover the periphery of the display window 23 by causing an end face 24a of the second light shielding tape 24 to abut on an end face 23b of the display window 23. Accordingly, the sealing portion 20c of the liquid crystal display panel 20 is covered with the second light shielding tape 24.

The second light shielding tape 24 is formed in such a way that an inner circumference thereof is larger than an outer circumference of the display window 23 to avoid interference during sticking. Thus, when the second light shielding tape 24 is stuck to cover the periphery of the display window 23 by causing the end face 24a of the second light shielding tape 24 to abut on the end face 23b of the display window 23, a gap is created between the end face 23a of the display window 23 and the end face of the second light shielding tape 24 on one side where the area 20a is formed. In the present exemplary embodiment, however, the first light shielding tape 22 is already stuck on one side where the area 20a is formed and thus, even if there is a portion not covered with the second light shielding tape 24, the flexible circuit board 21 will not be exposed.

Figure 4D:
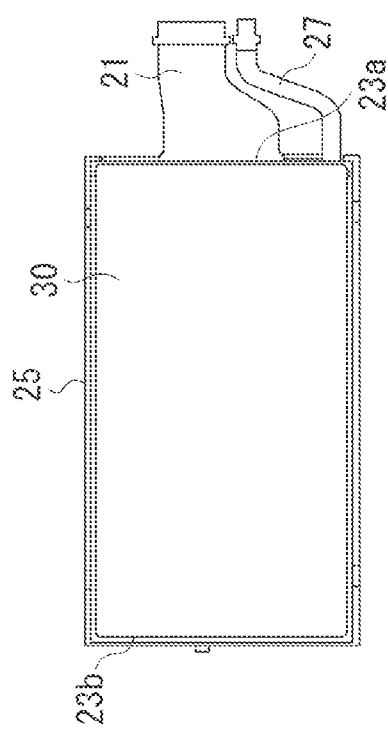

FIG. 4D illustrates the state in FIG. 3D when viewed from the front. By sticking the second light shielding tape 24 on the periphery of the display window 23 in this manner, leakage of light from the backlight light source and the light guiding member 28 which are held by the spacer 25 can be blocked.

As illustrated in FIG. 2, the sealing portion 20c of the liquid crystal display panel 20 is arranged in a notched portion of the spacer 25 and thus, a side face of the sealing portion 20c is not covered with the spacer 25. Therefore, light from the backlight may be leaked from the side face of the sealing portion 20c. In the present exemplary embodiment, the end face 24a of the second light shielding tape 24 is positioned and stuck to cover the periphery of the display window 23 by causing the end face 24a of the second light shielding tape 24 to abut on the end face 23b of the display window 23, so that a top face of the sealing portion 20c is covered with the second light shielding tape 24. Accordingly, even if light is leaked from the sealing portion 20c, the light will not be seen from the periphery of the display window 23.

FIGS. 5A to 5C illustrate a state in which the liquid crystal display unit 12 configured as described above is fixed to the camera assembly 13 and further, the rear cover 11 is fixed to the camera assembly 13.

FIG. 5A is a rear view of the digital camera 10. FIG. 5B is an enlarged view of an A-A section in FIG. 5A. FIG. 5C is an enlarged view of a C-C section in FIG. 5A.

As illustrated in FIG. 5B, when the liquid crystal display unit 12 and the rear cover 11 are fixed to the camera assembly 13, the surface of the display window 23, which is the surface of the liquid crystal display unit 12, is exposed through the opening 11a of the rear cover 11. At this point, a gap A is formed between an end face 11a1 of the opening 11a and the end face 23a of the display window 23 in consideration of manufacturing dimensional relations of parts. Even if an internal structure can be seen through the gap A, the flexible circuit board 21 will not be seen because the first light shielding tape 22 is stuck in the above described position.

As illustrated in FIG. 5B, the second light shielding tape 24 does not cover the periphery of the display window 23 near the end face 23a of the display window 23. This is because, as described above, the inner circumference of the second light shielding tape 24 is formed larger than the outer circumference of the display window 23 and the second light shielding tape 24 is positioned and stuck by causing the end face 24a of the second light shielding tape 24 to abut on the end face 23b of the display window 23.

More specifically, the second light shielding tape 24 is stuck by abutting the end face 24a thereof on the end face 23b of the display window 23, so that, as illustrated in FIG. 5C, the periphery of the display window 23 is covered with the second light shielding tape 24 near the end face 23b of the display window 23. Then, the top face of the sealing portion 20c of the liquid crystal display panel 20 is also covered with the second light shielding tape 24 and thus, light leaked from the sealing portion 20c will not be seen through a gap C between the end face 23b of the display window 23 and an end face 11a2 of the opening 11a.

Since the first light shielding tape 22 is formed of an insulating material and stuck in the above described position, a creepage distance from the gap A to the circuit connection portion 20b can be prolonged. Accordingly, if static electricity penetrates into the digital camera through the gap A, a discharge to the circuit connection portion 20b can be prevented.

Further, as illustrated in FIG. 5B, even if a force in the direction of an arrow F is applied to the rear cover 11 and the opening 11a is deformed, the flexible circuit board 21 can be prevented from being broken by the first light shielding tape 22 stuck on the flexible circuit board 21.

Further, in the present exemplary embodiment, the end face 11a1 of the opening 11a is located on the outer side from the edge 20d of the liquid crystal display panel 20, and a gap B is formed between the end face 11a1 of the opening 11a and the edge 20d of the liquid crystal display panel 20.

If the gap B is small, when the opening 11a is deformed, the end face 11a1 of the opening 11a and the edge 20d of the liquid crystal display panel 20 may act like edges of scissors to cut the flexible circuit board 21.

In the present exemplary embodiment, the end face 23a of the display window 23 protrudes from the edge 20d of the liquid crystal display panel 20, so that a sufficient distance to the extent that the flexible circuit board 21 is not cut is set between the end face 11a1 of the opening 11a and the edge 20d of the liquid crystal display panel 20.

According to the present exemplary embodiment, as described above, the flexible circuit board 21 will not be seen through the gap A between the end face 23a of the display window 23 and the end face 11a1 of the opening 11a. Further, if static electricity penetrates through the gap A, a discharge to the circuit connection portion 20b can be prevented. Furthermore, if the opening 11a is deformed, the flexible circuit board 21 can be prevented from being broken.

A second exemplary embodiment of the present invention will be described in detail below with reference to FIGS. 6A, 6B and 7.

Figure 6B:
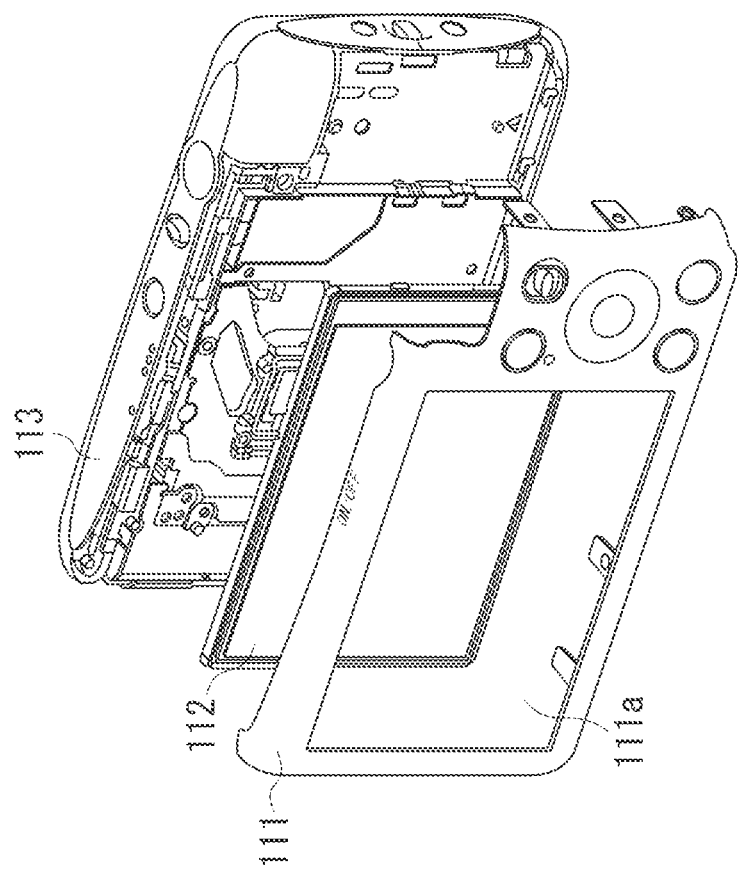
FIGS. 6A and 6B illustrate a digital camera as a second exemplary embodiment of the display apparatus of the present invention.
Figure 6A:
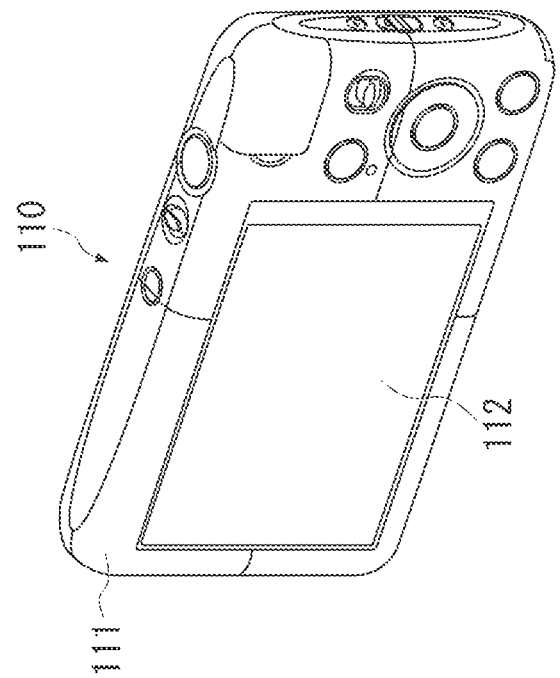

FIGS. 6A and 6B illustrate a digital camera 110 as the second exemplary embodiment of the display apparatus of the present invention. As illustrated in FIG. 6A, a liquid crystal display unit 112 to display an image and a rear cover 111 as an exterior member are mounted on a rear side of the digital camera 110. FIG. 6B is an exploded perspective view of the digital camera 110. After the liquid crystal display unit 112 is fixed to a camera assembly 113, the rear cover 111 is fixed to the camera assembly 113. The rear cover 111 has an opening 111a formed therein and is fixed to the camera assembly 113 in such a way that the surface of the liquid crystal display unit 112 is exposed through the opening 111a.

Figure 7:
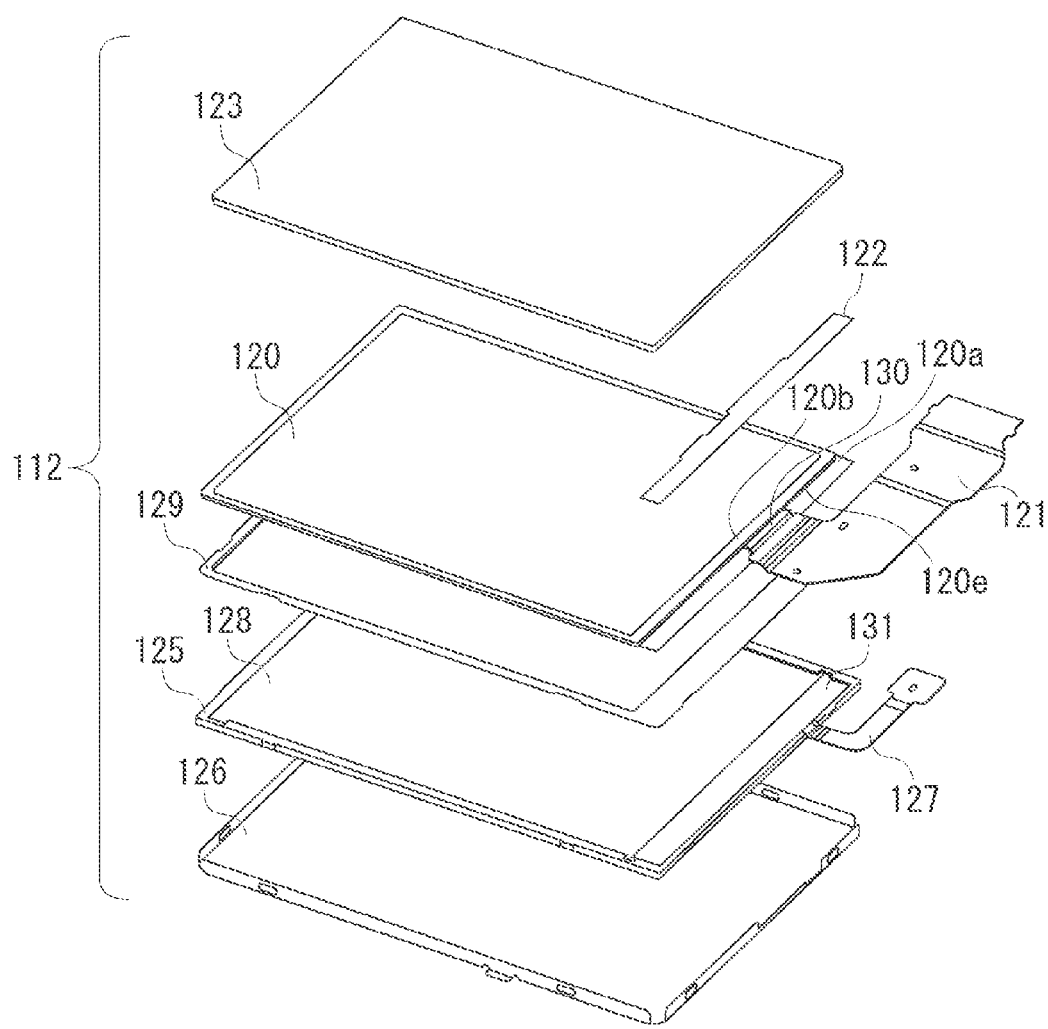
FIG. 7 is an exploded perspective view illustrating a configuration of a liquid crystal display unit.

FIG. 7 is an exploded perspective view illustrating a configuration of the liquid crystal display unit 112.

As illustrated in FIG. 7, a lower bezel 126 has a spacer 125 mounted thereon. The spacer 125 holds a liquid crystal display panel 120 and a backlight light source 131 and also fixes a light guiding member 128 that guides light from the backlight light source 131. The light guiding member 128 is positioned by the spacer 125 in a surface direction and a thickness direction. FIG. 7 illustrates a state in which the light guiding member 128 is held by the spacer 125. A backlight flexible circuit board 127 supplies power to the backlight light source 131.

The liquid crystal display panel 120 is fixed to the spacer 125 by a double-sided tape 129 having a light blocking effect. The liquid crystal display panel 120 is positioned in a surface direction and a thickness direction by being fixed to the spacer 125. As illustrated in FIG. 7, the double-sided tape 129 has a hollow quadrangular shape and covers the periphery of the liquid crystal display panel 120.

The liquid crystal display panel 120 is formed by laminating two glass substrates having different sizes in the longitudinal direction. The glass substrate longer in the longitudinal direction is placed below and a circuit connection portion 120b is formed by mounting an electronic part 130 in an area 120a on the lower glass substrate that is not covered by the upper glass substrate.

A flexible circuit board 121 is electrically connected to the circuit connection portion 120b. Thus, one short side of the liquid crystal display panel 120 is not covered with the upper glass substrate, the area 120a where the upper surface of the lower glass substrate is exposed is formed, and the electronic part 130 is mounted and the flexible circuit board 121 is provided in the area 120a.

A first light shielding tape 122 which is a first light shielding member is stuck on the area 120a in such a way that the electronic part 130, the circuit connection portion 120b, and the flexible circuit board 121 are covered therewith. When the first light shielding tape 122 is stuck on the area 120a, the first light shielding tape 122 is positioned by abutting one side thereof on an end face 120e of the upper glass substrate of the liquid crystal display panel 120.

After the first light shielding tape 122 is stuck, a display window 123 is bonded to the display surface of the liquid crystal display panel 120 via a gel state transparent resin or a low-rebound resilient transparent resin.

The display window 123 is bonded to the display surface of the liquid crystal display panel 120 so that an end face 123a of the display window 123 protrudes from the end face 120e of the upper glass substrate of the liquid crystal display panel 120 on one side where the area 120a of the liquid crystal display panel 120 is formed. The first light shielding tape 122 is covered with one side of the display window 123 from above.

At this point, like in the first exemplary embodiment, the spacer 125 is located on the outer side from the end face 123a of the display window 123 on one side where the area 120a of the liquid crystal display panel 120 is formed. On three sides other than the side where the area 120a of the liquid crystal display panel 120 is formed, the display window 123 is bonded to the display surface of the liquid crystal display panel 120 in such a way that end faces of the liquid crystal display panel 120 protrude from those of the display window 123.

In the present exemplary embodiment, the liquid crystal display panel 120 is fixed to the spacer 125 by the double-sided tape 129 having the light blocking effect and thus, light of the backlight light source and the light guiding member 128 is not leaked from the periphery of the display window 123. Therefore, in the present exemplary embodiment, there is no need to paste a light shielding tape on the periphery of the display window 123.

Figure 8A:
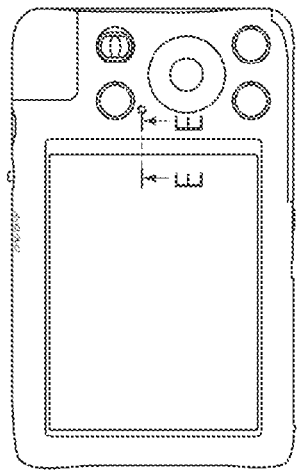
FIGS. 8A and 8B illustrate a state in which a liquid crystal display unit and a rear cover are fixed to a camera assembly.
Figure 8B:
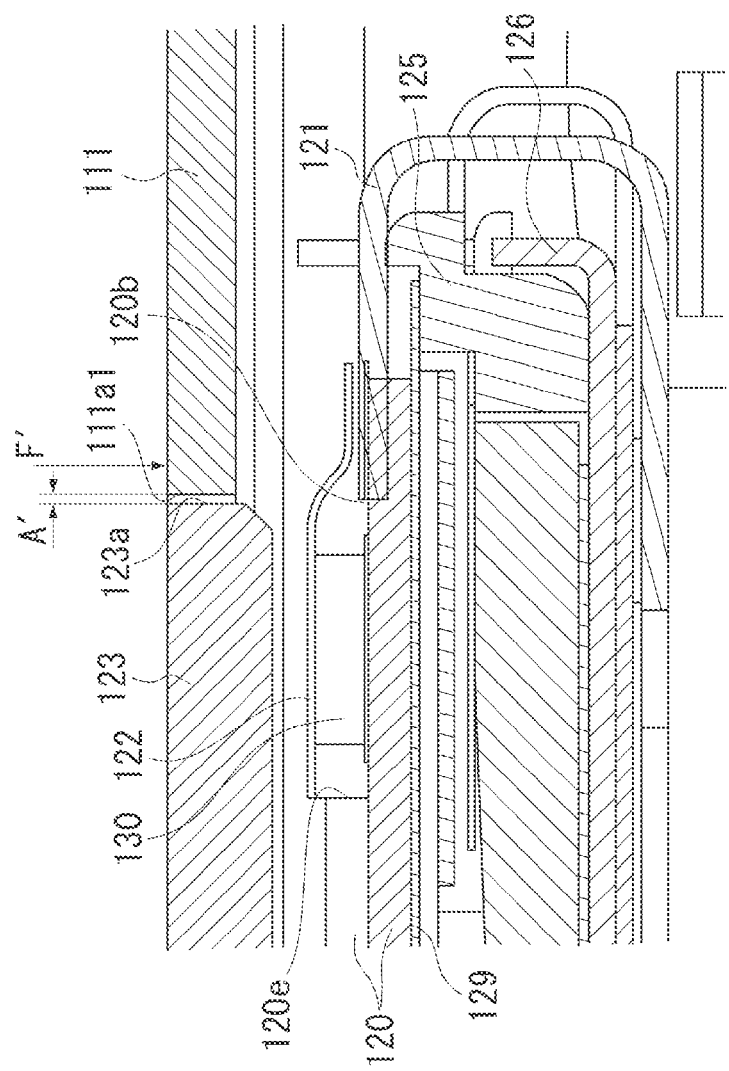

FIGS. 8A and 8B illustrate a state in which the liquid crystal display unit 112 configured as described above is fixed to the camera assembly 113 and further, the rear cover 111 is fixed to the camera assembly 113.

FIG. 8A is a rear view of the digital camera 110. FIG. 8B is an enlarged view of an E-E section in FIG. 8A.

As illustrated in FIG. 8B, when the liquid crystal display unit 112 and the rear cover 111 are fixed to the camera assembly 113, the surface of the display window 123, which is the surface of the liquid crystal display unit 112, is exposed through the opening 111a of the rear cover 111. At this point, a gap A' is formed between an end face 111a1 of the opening 111a and the end face 123a of the display window 123 in consideration of manufacturing dimensional relations of parts. Even if an internal structure is seen through the gap A', the flexible circuit board 121 will not be seen because the first light shielding tape 122 is stuck in the above described position.

Since the first light shielding tape 122 is formed of an insulating material and stuck in the above described position, a creepage distance from the gap A' to the electronic part 130 or to the circuit connection portion 120b can be prolonged. Accordingly, if static electricity penetrates into the digital camera through the gap A', a discharge to the electronic part 130 or the circuit connection portion 120b can be prevented.

Further, as illustrated in FIG. 8B, even if a force in the direction of an arrow F' is applied to the rear cover 111 and the opening 111a is deformed, the flexible circuit board 121 can be prevented from being broken by the first light shielding tape 122 stuck on the flexible circuit board 121.

According to the present exemplary embodiment, as described above, the flexible circuit board 121 will not be seen through the gap A' between the end face 123a of the display window 123 and the end face 111a1 of the opening 111a. Further, if static electricity penetrates through the gap A', a discharge to the electronic part 130 or the circuit connection portion 120b can be prevented. Furthermore, if the opening 111a is deformed, the flexible circuit board 121 can be prevented from being broken.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-021268 filed Feb. 2, 2010, which is hereby incorporated by reference herein in its entirety.

What is claimed is:

1. A display apparatus comprising:
   a liquid crystal display panel having a connection portion formed on one side of the liquid crystal display panel;
   a flexible circuit board which is connected to the connection portion;
   a display window member which is bonded to a display surface of the liquid crystal display panel;
   an exterior member having an opening where the display window member is arranged; and
   a first light shielding member which is stuck on the connection portion,
   wherein the first light shielding member is formed of an insulating material,
   wherein the display window member is arranged in the opening so that a first gap is formed between an end face of the display window member and an end face of the opening, and
   wherein the first light shielding member is stuck on the connection portion so that the flexible circuit board cannot be seen through the first gap.

2. The display apparatus according to claim 1,
   wherein the liquid crystal display panel is arranged so that a second gap is formed between the end face of the liquid crystal display panel and the end face of the opening.

3. The display apparatus according to claim 2,
   wherein the display window member is bonded to the display surface of the liquid crystal display panel so that the end face of the display window member protrudes from the end face of the liquid crystal display panel.

4. The display apparatus according to claim 3,
   wherein the display window member is bonded to the display surface of the liquid crystal display panel so that end faces on other sides of the liquid crystal display panel protrude from the end face of the display window member.

5. The display apparatus according to claim 4, further comprising:
a second light shielding member stuck on the liquid crystal display panel so that a periphery of the display window member is covered therewith after the first light shielding member is stuck on the connection portion.

6. The display apparatus according to claim 5,
wherein the liquid crystal display panel has a sealing portion formed on an opposite side of the connection portion, and
wherein the second light shielding member is stuck on the liquid crystal display panel so that the sealing portion is covered therewith.

7. The display apparatus according to claim 1,
wherein an electronic part is arranged on the one side of the liquid crystal display panel, and
wherein the first light shielding member is arranged to cover the electronic part, the connection portion, and the flexible circuit board if the display window is arranged in the opening so that the gap is formed between the end face of the display window and the end face of the opening.

8. The display apparatus according to claim 1,
wherein the first light shielding member stuck on the connection portion so that an end face of the first light shielding member protrudes from an edge of the liquid crystal display panel.

9. The display apparatus according to claim 1,
wherein if static electricity penetrated through the first gap, the first light shielding member prevents a discharge to the connection portion.

10. The display apparatus according to claim 1,
wherein an electronic part is arranged on the connection portion, and
wherein the first light shielding member is stuck on the connection portion so that the electronic part and the flexible circuit board are covered therewith.

* * * * *